June 20, 1967  H. G. BLANK  3,327,163
ELECTROLUMINESCENT BAR GRAPH INDICATOR
Filed Nov. 2, 1965  4 Sheets-Sheet 1

INVENTOR.
HANS G. BLANK
BY R. J. Frank
ATTORNEY.

INVENTOR.
HANS G. BLACK
BY R. J. Frank
ATTORNEY

INVENTOR.
HANS G. BLANK

3,327,163
ELECTROLUMINESCENT BAR GRAPH INDICATOR
Hans G. Blank, Bronx, N.Y., assignor to General Telephone and Electronics Laboratories, Inc., a corporation of Delaware
Filed Nov. 2, 1965, Ser. No. 506,621
12 Claims. (Cl. 315—169)

This invention relates to display devices and in particular to display devices of the type wherein the length of an indicator corresponds to the quantity being measured.

Display devices in which information is presented in the form of bar graphs have potentially wide application in industrial process controls, aircraft instrumentation and, in general, in systems which require that a large number of devices be located in a relatively small volume. Such display devices should have the capability of responding rapidly to digital input signals, require a minimum amount of space, exhibit essentially constant brightness independent of the magnitude of the input signal, reduce the possibility of false readings due to undesired couplings between the energizing voltage and the device and function properly under a wide variety of environmental conditions.

Generally, one type of bargraph display employs an elongated electroluminescent lamp in which the long dimension is calibrated in terms of the quantity being measured. One electrode of the lamp consists of a number of individual electrode segments with the other common electrode extending throughout the entire length of the lamp. The application of an energizing voltage between selected electrode segments and the lamp common electrode results in the illumination of a bar. The length of this bar depends on the magnitude of the quantity being measured which is generally expressed in digital form.

Bargraph display devices are well-suited for construction as integrated structures since electroluminescent lamps employing crossed electrode translators containing a nonlinear resistor, such as described in my copending patent application Ser. No. 305,050, filed Aug. 28, 1963, U.S. Patent No. 3,240,990, issued Mar. 15, 1966 are readily formed on the same substrate by conventional layer techniques. Briefly, these translators utilize orthogonal electrode arrays formed on either side of a nonlinear resistive layer. The individual electrodes are coupled to a varying number of other electrodes through the nonlinear layer so that a binary input signal is translated into the desired output signals which may be employed to energize an electroluminescent display device.

It is an object of the present invention to provide a simplified and improved bargraph display device.

Another object is the provision of a bargraph display in which the brightness of the display is substantially constant.

A further object is to provide a bargraph display having improved reliability.

In accordance with the present invention, a bragraph display is provided in which an input signal applied to selected electrodes is displayed as a bar of light having a length proportional to the magnitude of a measured quantity. The device comprises an elongated electroluminescent lamp having first and second sets of electrodes affixed thereto. The lamp is formed on a supporting substrate with the first set of electrodes extending outwardly from the lamp on the surface of the substrate. The second set of electrodes, formed on the opposing side of the lamp, each overlie a group of first electrodes. The concurrent energization of a second electrode and a first electrode from within the corresponding group results in the illumination of that portion of the lamp between these electrodes. By selecting one end of the lamp as the reference, an illuminated bar is provided by energizing all of the second electrodes up to and including the group of first electrodes containing the desired height concurrently with the required number of first electrodes.

Electroluminescent materials typically exhibit a brightness which is a function of the energizing voltage. When connected in series with a nonlinear resistor, the combination of the resistor and the electroluminescent material possesses a threshold voltage below which no light is emitted by the electroluminescent material. This threshold voltage is due to the decrease in the resistance of the nonlinear resistor as the voltage applied across the series combination increases with the result that the portion of the applied voltage appearing across the electroluminescent material increases substantially. This combination permits an electroluminescent lamp to be utilized as at "and" circuit by applying signals to both sets of the lamp electrodes. This result is obtained by selecting the signals applied to each set of electrodes so that each has a magnitude less than the threshold voltage and a 180 degree phase difference is provided therebetween. Then, coincident application of the signals is required for illumination.

The first set of electrodes extend outwardly from the lamp on the substrate and are covered by an insulating mask having a number of apertures or coding holes therein. The apertures are positioned such that each is in substantial registration with a single first electrode. A nonlinear resistance layer is formed on the insulating mask and extends through the apertures to the first electrodes. The nonlinear layer is of the type wherein the electrical resistance decreases as the voltage applied across the layer increases. Stated another way, the current through any selected portion of the layer in either direction varies according to the equation $I = KV^n$, where $I$ is the current through the non-linear layer, $V$ is the voltage across the selected portion of the layer, $K$ is a constant and $n$ is a number greater that 1, typically between 6 and 10.

A set of third electrodes is formed on the nonlinear resistance layer. These electrodes extend in a direction substantially perpendicular to the first electrodes and form a plurality of cross-overs therebetween. The third electrodes are positioned on the nonlinear layer such that particular crossovers are in substantial registration with selected apertures in the insulating mask.

In addition, a fourth set of electrodes is formed on the nonlinear resistance layer so as to overlie selected first electrodes. These electrodes form a number of crossovers with the selected first electrodes, each of which is in substantial registration with an aperture in the insulating mask.

The fourth electrodes, like the second electrodes, overlie a number of first electrodes and are coupled to each corresponding first electrode by the nonlinear layer through an aperture in the insulating mask. The fourth electrodes provide, in effect, a coarse control in that with a signal applied to the second electrodes, the length of the illuminated bar is determined by which of the fourth electrodes have a signal applied thereto. The length of the bar, therefore, is coarsely controlled by the fourth electrodes.

The fine control is provided by applying a signal to selected third electrodes concurrently with the application of the out of phase signal to certain second electrodes. Each third electrode is coupled to the same first electrode in each group so that the fine control exists within each group of first electrodes.

In a typical application, wherein the bargraph is capable of displaying 96 different levels, the number of first electrodes is selected to be equal to or one less than the number of levels depending on whether the zero level is to be displayed. The first electrodes are then divided into six groups with the first group containing fifteen electrodes in the case where zero is not displayed. Accordingly, six second electrodes are formed on the elongated lamp with each second electrode overlying a group of first electrodes.

Taking one end of the lamp as a reference, each third electrode is coupled through the insulating mask to the first electrode in each group. For example, one third electrode is coupled to the fifth first electrode in each group. While the number of third electrodes may equal the number of first electrodes in each group, the construction of the coarse control permits the number of third electrodes to be reduced if desired. This feature is provided by having the first fourth electrode overlie 16 first electrodes rather than 15 and is discussed further in the detailed portion of the specification.

Each fourth electrode is coupled to a number of first electrodes. This number is equal to the number of first electrodes in each group except in the case where the zero level is not displayed, wherein the first fourth electrode is coupled to 16 first electrodes rather than the 15 first electrodes which underlie the first second electrode.

When a bar of length equal to 20 levels is to be displayed, a signal is applied to the first two second electrodes which partially energizes the first 31 levels of the lamp. The out-of-phase signal is then applied to the first four third electrodes which are electrically coupled through the nonlinear layer to selected first electrodes. This results in the illumination of levels 1 through 4 and 17 through 20.

To provide an unbroken illuminated bar, the out-of-phase signal is also applied to the first fourth electrode which alone would illuminate, in combination with the first two second electrodes, levels 1 through 16. By energizing the second, third and fourth electrodes concurrently, a continuous bar may be displayed.

The control signal for the bargraph is typically a binary-coded input signal which, in the above case of 96 levels, contains seven digits. The coarse control provided by the second and fourth electrodes may be attained by utilizing the three most significant digits from the binary signal. These digits correspond to levels 16, 32 and 64 and thus these digits determine which of the second and fourth electrodes should be energized. It will be noted that the first second electrode is energized independently of the coarse control since it is used to illuminate levels 1 through 15. The remaining digits control the third electrodes.

Further, the application of a signal to a third electrode does not, in the absence of a signal applied to one or more second electrodes result in the illumination of a portion of the bar. Therefore, applying the signal to only selected second electrodes compensates for the fact that each third electrode is coupled to a first electrode in each group.

It is to be noted that in the above construction, each segment of the electroluminescent lamp is energized either through a single aperture or two apertures in parallel. The nonlinear resistance layer minimizes the difference between energization of the lamp by parallel apertures and a single aperture since the change in voltage across the nonlinear resistance is quite small for the decrease in current flowing through each aperture in the case of parallel energization. As a result, the voltage between the selected first and second electrodes remains substantially constant so that all segments energized exhibit a substantially uniform brightness.

In addition, it has been found advantageous in certain applications to employ an insulating mask comprising first and second apertured insulating layers having a number of apertured coplanar large area conductors therebetween. Each conductor is coupled to one of the second electrodes and serves as a shield between the first electrodes of that group and the third electrodes. This construction reduces the capacitive coupling between a single first electrode and all third electrodes not coupled thereto through an aperture. As a result, spurious energization of the corresponding segment of the lamp is substantially eliminated.

Further features and advantages of the present invention will become more readily apparent from the following description of specific embodiments taken in conjunction with the accompanying drawings, in which.

Figure 1:
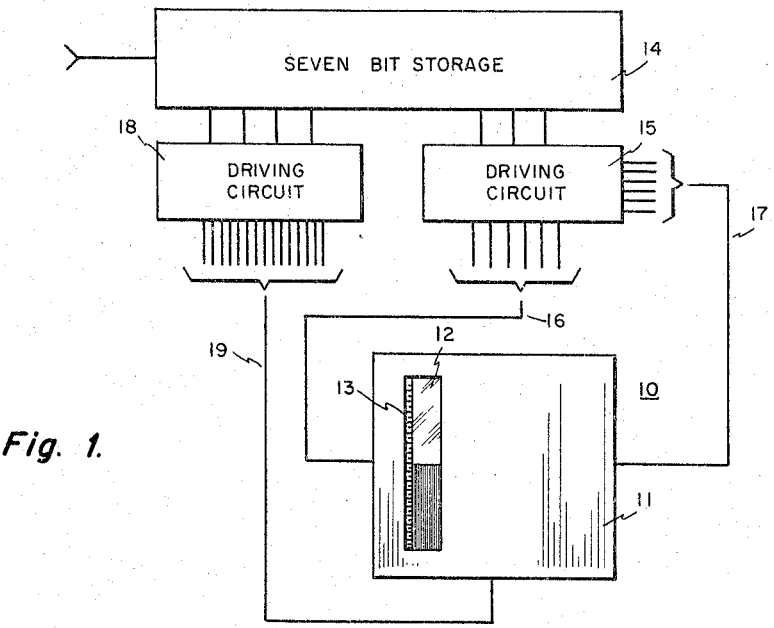
FIG. 1 shows a bargraph display device constructed in accordance with the present invention and a block diagram of the circuitry for controlling the energization thereof.

Referring to FIG. 1, the bargraph display 10 as seen from the viewing side comprises generally a glass substrate 11 through which an elongated electroluminescent lamp 12 (shown partially illuminated), is viewed. Adjacent lamp 12 is a scale 13 to facilitate reading the height of the illuminated bar.

The control circuitry shown in block form comprises a seven bit storage device 14 to which the binary-coded input signal indicative of the quantity to be displayed is supplied. The three most significant digits are supplied to driving circuit 15. Driving circuit 15 has two sets of outputs, shown as leads 16 and 17, which are energized according to these three digits to provide the coarse output signals. The signals supplied to leads 16 and 17 are alternating signals of equal magnitude and, for reasons that will later be explained, have a 180 degree phase difference therebetween.

Figure 2:
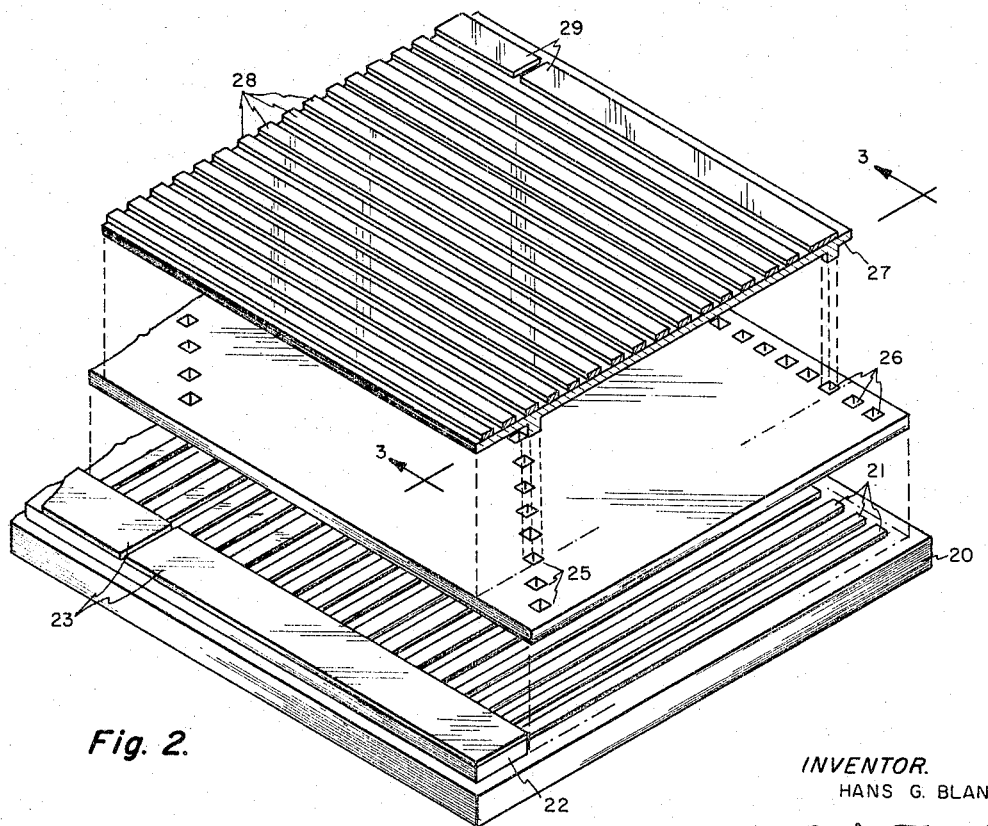
FIG. 2 is a fragmentary exploded view showing one embodiment of the display device of FIG. 1.
Figure 3:
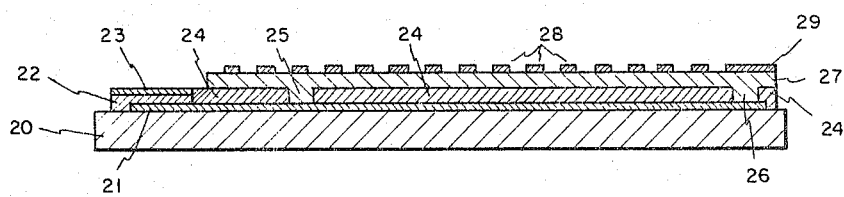
FIG. 3 is a side view in section taken along line 3—3 of FIG. 2.
Figure 4:
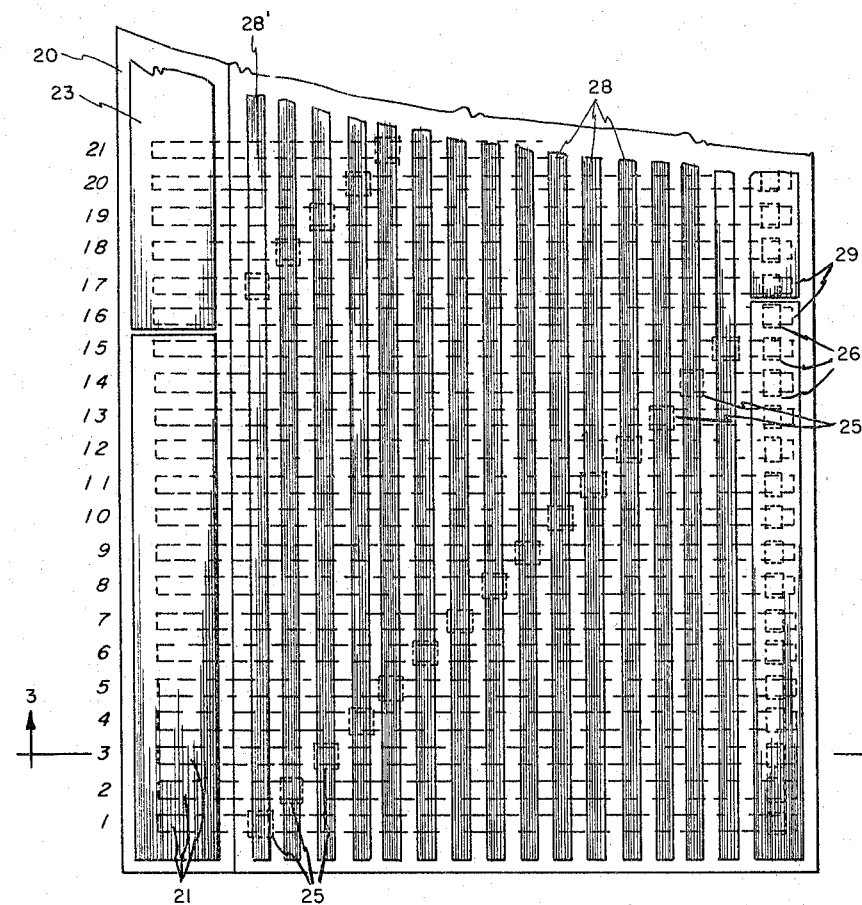
FIG. 4 is a fragmentary view of FIG. 2.

Also, a driving circuit 18 is coupled to storage device 14 to receive the four least significant digits and provide an alternating signal at certain of its output leads 19 which in turn are coupled to display 10. The magnitudes of the output signals of driving circuit 18 are equal to those of driving circuit 15. FIGS. 2, 3 and 4 illustrate in detail one embodiment of display 10 having 95 elements so as to provide a bar of 95 discrete increments. Throughout the following discussion, the level corresponding to a zero input is omitted since its inclusion in the display would result in the lowermost increment being continually illuminated.

The display comprises a transparent insulating substrate 20, such as glass, having 95 spaced, parallel, transparent first electrodes 21, such as $SnO_2$, formed on the surface thereon. Overlying a portion of these electrodes is an elongated layer of electroluminescent material 22, such as copper activated zinc sulfide, having a plurality of second electrodes 23 formed thereon. As shown in FIGS. 2 and 4, each second electrode extends in a direction perpendicular to that of the first electrodes 21 and overlies, not one, but a group of first electrodes. The number of first electrodes in each group is 16, noting that zero has been omitted from the first group. For a 95 increment bar, 6 second electrodes would be employed. However, the number of second electrodes may not exceed the numeric sum of the number of most significant digits utilized, in this case 7.

An insulating mask 24 such as glass frit, is formed on the substrate so as to overlie the remaining portion of the first electrodes. The mask is provided with a plurality of apertures or coding holes 25 and 26. Each coding hole is in substantial registration with a single first electrode. Coding holes 26 are aligned in a direction perpendicular to that of the first electrodes 21 and register in succession with the first electrodes. Although a coding hole 26 may be provided for each first electrode of the display, the last 16 may be omitted as later explained.

Coding holes 25 are formed in a series of staircases with the number holes in each staircase being equal to or one less than the number of first electrodes in each group. In the embodiment shown, noting particularly FIG. 4, 15 coding holes 25 comprise a staircase, although 16 first electrodes comprise a group.

A layer 27 of nonlinear resistive material, such as cadmium sulfied and epoxy resin, is then deposited over insulating mask 24. This material extends through the apertures or coding holes to contact the exposed portions of first electrodes 21. A set of spaced, parallel third electrodes 28 are secured to the surface of nonlinear layer 27 and extend in a direction substantially perpendicular to first electrodes 21. In addition, a set of spaced fourth electrodes 29 are secured to the surface of layer 27. The fourth electrodes also extend in a direction substantially perpendicular to first electrodes.

Both the third electrodes 28 and the fourth electrodes 29 are in substantial registration with a set of corresponding coding holes 25 and 26 in mask 24 which, in turn, are in substantial registration with related first electrodes 21. It shall be noted that the coding holes permit selected third and fourth electrodes to be electrically coupled to selected first electrodes through nonlinear layer 27.

The number of third electrodes 28 is equal to the number of coding holes 25 in a staircase and, in this embodiment, equals 15. Each third electrode is electrically coupled to the same first electrode in each group. For example, in FIG. 4, third electrode 28' is shown coupled to the lowermost first electrode of each group, i.e. the first electrodes corresponding to levels 1, 17, 33 and so on.

The number of fourth electrodes 29 is, in practice, equal to one less than the number of groups of first electrodes with the last fourth electrode being omitted. Each fourth electrode is electrically coupled to each first electrode that it overlies. In the embodiment shown in FIG. 4, the number of first electrodes 21 electrically coupled to each fourth electrode 29 is equal to the number of first electrodes in a group or 16. As a result, the first electrodes coupled to each fourth electrode do not all reside within the same group. However, as later becomes apparent, each fourth electrode may correspond to a group of first electrodes.

Returning now to FIG. 1, driving circuit 15 provides A.C. output signals in accordance with the three most significant digits of the binary input signal which are coupled to the display device by leads 16 and 17. Leads 16 are coupled to individual second electrodes, while leads 17 are coupled to individual fourth electrodes. The A.C. signals appearing at leads 16 and 17 are selected to be of equal magnitude and have a phase difference of 180 degrees therebetween. The output signals of driving circuit 18 are coupled to the individual third electrodes of the display by leads 19. These outputs are A.C. signals having a magnitude equal to the output signals of circuit 15 and are in phase with the signals coupled to the fourth electrodes. This signal magnitude is selected to be about one-half that required to excite the electroluminescent layer. Therefore, a signal supplied to either the third or fourth electrode coupled to an individual first electrode through the nonlinear layer and a signal supplied to the second electrode of that group is required to energize that section of the lamp.

As mentioned previously, a coarse control is provided by the second and fourth electrode configurations. This control occurs from the use of the three most significant digits of the 7 digit binary input signal which correspond to levels 64, 32 and 16. These digits then indicate which group of levels contains the quantity being measured. As shown in FIG. 4, level 16 can be illuminated by the concurrent application of a signal to the first two second electrodes 23 and the first fourth electrode 29. This pattern is repeated for levels 32, 48, 64, and 80 for the 95 level display. The coarse control then requires that the number of second electrodes 23 energized by the output of driving circuit 15 is one greater than the number of fourth electrodes 29 so energized. By continually energizing the first second electrode corresponding to levels 1 through 15, the second second electrode and the first fourth electrode are concurrently energized by the out-of-phase output signals of circuit 15 when the digit corresponding to level 16 is present. For level 32, circuit 15 energizes the second and third second electrodes 23 and the first and second fourth electrodes 29.

At the same time that the coarse control is effected, the driving circuit 18 provides a signal at selected third electrodes 28 in accordance with the four least significant digits of the binary signal. These digits, whose sum is 15, provide the fine control within each group. The 15 third electrodes are each coupled through coding holes 25 by layer 27 to the corresponding first electrode 21 in each group. The driving circuit 18, which has an output lead 19 for each third electrode 28, provides an output signal for a number of leads in accordance with the sum of the four least significant digits.

In a typical operation, for example a binary input of 0010100 or 20, the coarse control provides an output signal at the first fourth electrode and the second second electrode. Since the first second electrode is continually energized or, as an alternative, is energized at the presence of any digit in the binary signal, the coarse control results in levels 1 through 16 being illuminated. In addition, the second second electrode half-energizes all the remaining levels in that group, i.e. levels 17 through 31. The arithmetic sum of the fine control digits, 0100, is 4 and the first four third electrodes 28 are energized. This results in the illumination of levels 17 through 20. Consequently, the magnitude of the input signal is accurately displayed by the combination of the coarse and fine controls.

The construction of the display is such that each section of the lamp is energized through either a single coding hole, in the previous example levels 15 and 16 are each energized through a single coding 26, or two coding holes in parallel, as in the case of levels 1 through 4 which are each energized through coding holes 25 and 26. The variation in the voltage appearing between the first and second electrodes for both cases is substantially minimized by the use of the nonlinear resistive layer. When the lamp section is energized through two apertures, the current through each aperture is approximately one-half that flowing through a single aperture. However, the variation in the voltage across the nonlinear layer is quite small due to the $I = KV^n$ characteristic of the layer. As a result, the portion of the voltage appearing across the lamp is maintained substantially constant so that the display exhibits essentially constant brightness.

The last fourth electrodes 29, corresponding to levels 81 through 95, is preferably omitted since the fine control provides the energizing signal for the last 15 levels. It shall be noted that the second and fourth electrodes are not aligned, i.e. the second and fourth electrodes do not contain the same number of first electrodes. However, these electrodes may be aligned if desired by extending the lower second electrode to overlie 16 first electrodes without substantially changing the operation of the display. In addition, the number of third electrodes may be made equal to the number of first electrodes in each group if desired. The present coarse control is designed to energize the last first electrode of each group so that only 15 third electrodes are required.

Figure 5:
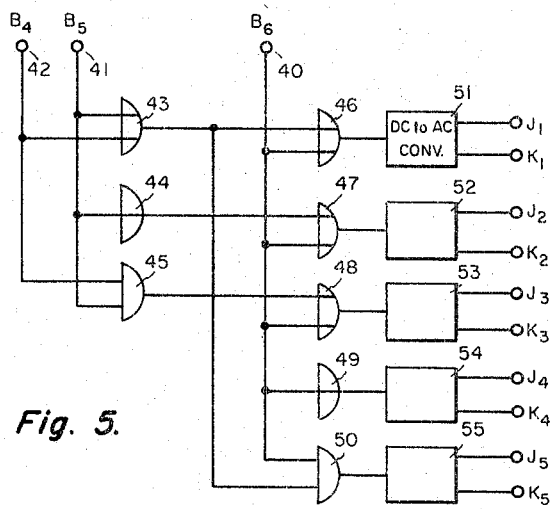
FIG. 5 is a block diagram of driving circuit 15 of FIG. 1.

The contents of driving circuit 15 are shown in FIG. 5 with the three most significant digits $B_6$, $B_5$ and $B_4$ applied to terminals 40, 41 and 42 respectively. The digits are combined by a plurality of conventional logic circuits 43 through 50 to form an intermediate coded signal $jK_2$ which, in turn, is converted to corresponding A.C. output signals by converters 51 through 55. A typical converter is shown in detail in FIG. 6 as comprising an A.C. voltage source 56 connected in series with primary winding 57a of transformer 57 and silicon-controlled rectifier (SCR) 58. The gate electrode of SCR 58 is connected to terminal 59. The center-tapped secondary winding 57b of transformer 57 is connected to terminals 60 and 61. In the absence of an intermediate coded signal at terminal 59, the impedance of the SCR is relatively high so that essentially no A.C. signal is coupled to secondary winding 57b. When a signal is provided at terminal 59, the impedance of the SCR is lowered and essentially the entire A.C. signal is coupled to winding 57b. Since winding 57b is center-tapped to ground, the signals appearing at terminals 60 and 61 are of equal magnitude and have a phase difference of 180 degrees. The $J_2$ terminal is coupled to the $i+1$ second electrode 23 of the display, noting that the first second electrode is energized either by the presence of any digit in the binary signal or by initiating operation of the display. The $K_2$ terminal is coupled to the fifth fourth electrode of the display.

The three most significant digits of the input signal, $B_4$, $B_5$ and $B_6$, are transformed into the coarse control for the second and fourth electrodes. This is provided by the use of "or" circuits 43, 44 and 46 through 49 and "and" circuits 45 and 50. For example, the presence of the $B_6$ digit indicates that at least 63 levels, excluding zero, are to be energized. Consequently, $B_6$ alone results in an A.C. output at terminals $J_1K_1$ through $J_4K_4$ which fully energizes the first 63 levels of the display. In addition, the $J_4$ terminal is coupled to the sixth second electrode which half energizes levels 64 through 79.

Further, if $B_6$ and either $B_5$ or $B_4$ are present, "or" circuit 43 passes the corresponding voltage level to "and" circuit 50 which in combination with $B_6$ results in the energization of the first 79 levels of the display. In addition, levels 80 through 95 are half energized by the A.C. output at terminal terminal $J_5$. Other input combinations provide corresponding combinations of A.C. signals in a similar manner.

Figure 7:
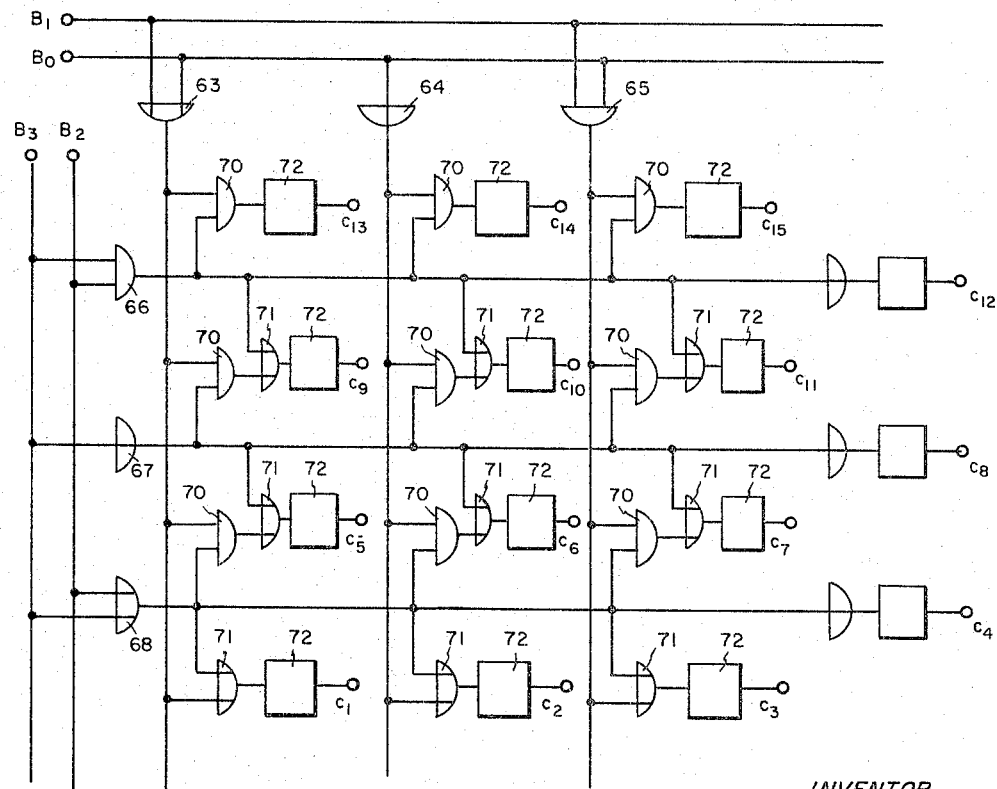
FIG. 7 is a block diagram of driving circuit 18 of FIG. 1.

The fine control is provided by driving circuit 18 shown in FIG. 7. This circuit receives the four least significant digits $B_3$, $B_2$, $B_1$ and $B_0$ and, in effect, sums these digits to determine how many of the output terminals $C_1$ through $C_{15}$ are to be energized. Each output terminal is coupled to an individual third electrode of the display which, in turn, is coupled through the nonlinear layer to the corresponding first electrode of each group. In this embodiment, terminal $C_1$ is coupled to the first third electrode 28' of FIG. 4 with terminal $C_{15}$ being coupled to the last or fifteenth third electrode. As mentioned previously, the driving circuit is constructed such that the terminal corresponding to the numeric sum of these digits is energized in combination with all lower terminals. In other words, when $C_8$ is energized by the digits 1000 terminals $C_7$ through $C_1$ must also be energized.

This operation is provided by the array-like circuit of FIG. 7 by employing "and" circuits 65 and 66 and "or" circuits 63, 64, 67 and 68 to determine which combination of digits are present in each pair. These digits are further combined by "and" circuits 70 and "or" circuits 71 positioned within the array to provide 15 different outputs, each of which is coupled to an A.C.-D.C. converter 72.

Figure 6:
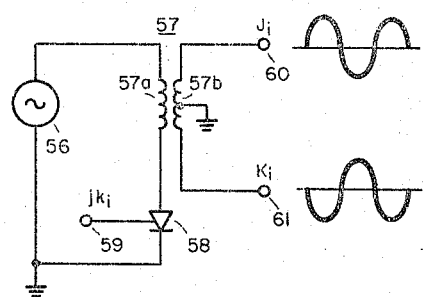
FIG. 6 is a schematic diagram of a typical D.C. to A.C. convertor shown in FIG. 5.

The converter 72 is similar to that shown in FIG. 6 except that the magnitude of A.C. source 56 is reduced to one-half the former value, the center-tap of secondary winding 57b is removed and output terminal 60 is coupled to ground. This in effect provides an A.C. signal at terminal 61 which is equal in phase and magnitude for both converters in response to a signal applied at terminal 59.

The operation of the circuit of FIG. 7 is best understood by considering, for example, the application of the four digit binary signal 0101 equal to numeric 5. In this case, a voltage level denoting the presence of a 1 in a digit is passed by "or" circuits 63 and 68, and not by "or" circuits 64 and 67 and "and" circuits 65 and 66. The lack of a signal passed by "and" circuit 66 insures that no output appears at terminals $C_{12}$ through $C_{15}$. In addition, the lack of a signal passed by "or" circuit 67 insures that no output appears at terminals $C_{11}$ through $C_8$. However, the signal passed by "or" circuit 68 provides an output at terminals $C_4$ through $C_1$ and, in combination with the signal passed by "or" circuit 63 provides an output at terminal $C_5$.

The coarse control, which determines the proper group of first electrodes containing the highest level to be displayed, in combination with the fine control, which due to the coupling of each third electrode to the corresponding first electrode in each group necessarily provides control within the proper group, result in the concurrent energization of all levels up to and including the level corresponding to the quantity being measured.

Figure 9:
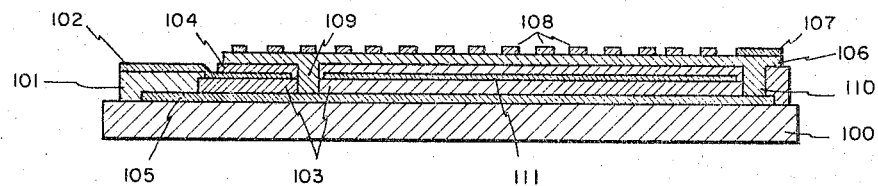
FIG. 9 is a side view in section taken along line 9—9 of FIG. 8.
Figure 8:
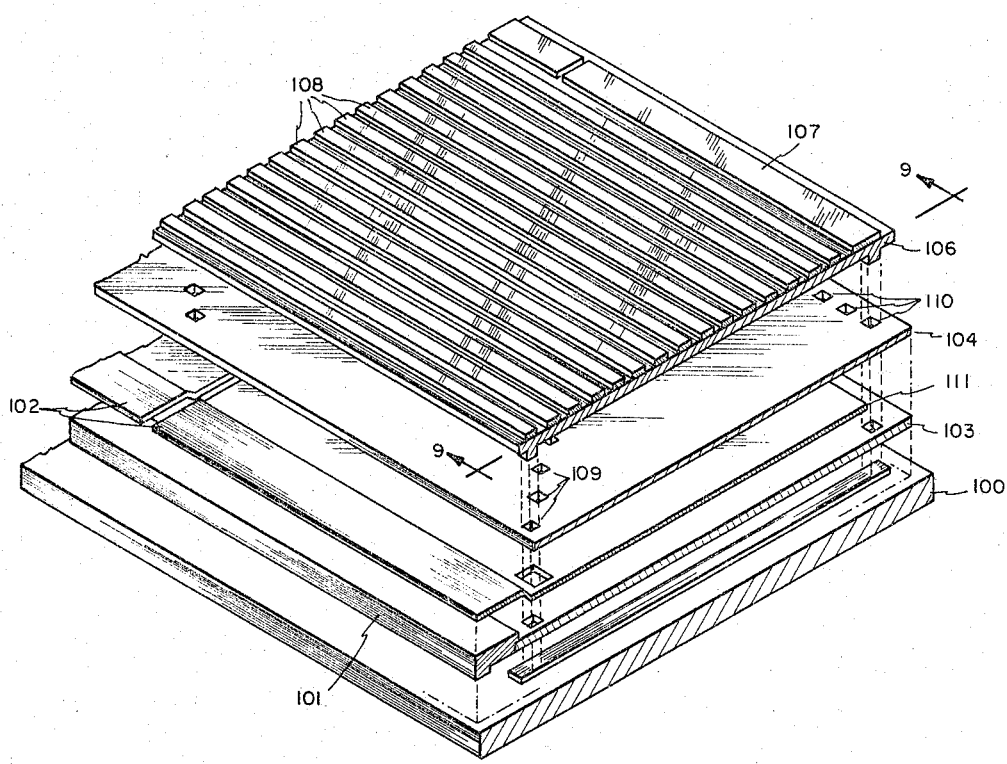
FIG. 8 is a fragmentary exploded view showing a second embodiment of the invention.

A second embodiment of the invention is shown in FIGS. 8 and 9. This embodiment differs from that shown in FIGS. 2, 3 and 4 in that the insulating layer 24 shown therein is modified to comprise first and second insulating layers 103 and 104 with a plurality of coplanar, large area conductors 111 positioned therebetween. The insulating layers and the conductors contain apertures or coding holes 109 and 110 which are in registration with individual first electrodes 105 in the manner described in connection with FIGS. 2, 3 and 4. It shall be noted that nonlinear layer 106 provides electrical coupling between selected third and fourth electrodes 108 and 107 and selected first electrodes 105.

The nonlinear layer is shown electrically insulated from the conductors 111 by a portion of insulating layer 104 extending into the apertures in the conductor. This may be readily provided during the formation of the layered structure by making the apertures in conductors 111 somewhat larger than the final apertures whereby a portion of insulating layer 104 downwardly extends to insulating layer 103.

The number of large area conductors 111 is equal to the number of second electrodes with each of the conductors being individually coupled to a corresponding second electrode as shown in FIG. 8. In addition, the area of each large area conductor 111 is selected such that it extends between all of the third electrodes and all of the first electrodes in a particular group.

This construction establishes an equipotential plane between the first and third electrodes. These conducting planes are capacitively coupled to the first and third electrodes through the adjacent insulating layers. The electroluminescent lamp capacitance between the first and the second electrodes is electrically in parallel with the capacitance between the first electrodes and the large area conductors so that these capacitances are additive. The second electrodes and the corresponding large area conductors are connected to the external driving circuit and are essentially unaffected by the energization of the third electrodes. This substantially eliminates the possibility of spurious energization of unwanted portions of the electroluminescent lamp due to the capacitive coupling between first and third electrodes.

While the above description has referred to specific embodiments, it will be understood that many modifications and variations may be made therein without departing from the spirit and scope of the invention.

What is claimed is:

1. A display device for providing an illuminated bar wherein the length of the bar is determined in accordance with an input signal comprising:
    (a) a substrate;
    (b) a plurality of spaced first electrodes formed on said substrate;
    (c) an elongated layer of electroluminescent material formed on said substrate, said layer overlying a first portion of said first electrodes;
    (d) a plurality of second electrodes formed on said layer of electroluminescent material, each second electrode overlying a group of first electrodes;
    (e) insulating means formed on said substrate and overlying a second portion of said first electrodes, said insulating means having a plurality of apertures therein, each of said apertures being in substantial registration with one of said first electrodes;
    (f) resistance means substantially overlying said insulating means and extending through said apertures to the corresponding first electrodes;
    (g) a plurality of spaced third electrodes formed on said resistance means, said third electrodes being in substantial registration with selected apertures in said insulating means so that each of said third electrodes is electrically coupled to a first electrode in each group; and
    (h) a plurality of fourth electrodes formed on said resistance means, said fourth electrodes being in substantial registration with selected apertures in said insulating means whereby said fourth electrodes are electrically coupled to selected first electrodes, the application of energizing signals to selected second, third and fourth electrodes resulting in a section of said electroluminescent layer being energized to provide an illuminated bar.

2. Apparatus in accordance with claim 1 in which said resistance means is a nonlinear resistive layer.

3. Apparatus in accordance with claim 2 in which each fourth electrode overlies a number of first electrodes equal to the number of first electrodes in a group whereby the application of energizing signals to selected second and fourth electrodes provides a coarse control of the length of the illuminated bar.

4. Apparatus in accordance with claim 3 in which the first second electrode on said electroluminescent layer overlies less than a complete group of first electrodes.

5. Apparatus in accordance with claim 3 in which each third electrode is coupled through said apertures to the same first electrode in each group whereby the application of energizing signals to selected third electrodes provides a fine control of the length of the illuminated bar.

6. Apparatus in accordance with claim 1 in which said insulating means comprises:
    (a) a first apertured insulating layer formed on said substrate and overlying a second portion of said first electrodes, said first layer having a plurality of apertures therein, each of said apertures being in substantial registration with one of said first electrodes;
    (b) an apertured conducting layer formed on said insulating layer, the apertures in said layer being in registration with the apertures in said first layer, said layer being electrically coupled to said second electrodes; and
    (c) a second apertured insulating layer formed on said conducting layer, the apertures in said layer being in registration with the apertures in said first layer.

7. A display device for providing an illuminated bar wherein the length of the bar is determined in accordance with a digital input signal comprising:
    (a) a transparent insulating substrate;
    (b) a plurality of transparent parallel first electrodes formed on said substrate;
    (c) an elongated layer of electroluminescent material formed on said substrate and extending in a direction transverse to said first electrodes, said layer overlying a first portion of said first electrodes;
    (d) a plurality of second electrodes formed on said layer of electroluminescent material, each of said second electrodes overlying a group of said first electrodes;
    (e) an insulating mask formed on said substrate and overlying a second portion of said first electrodes, said mask having a number of apertures therein, each of said apertures being in substantial registration with one of said plurality of first electrodes;
    (f) a nonlinear resistive layer formed on said insulating mask and extending through said apertures therein to the corresponding first electrodes;
    (g) a plurality of third electrodes formed on said nonlinear resistive layer, said third electrodes extending in a direction substantially perpendicular to said first electrodes, said third electrodes being in substantial registration with selected apertures in said insulating mask so that each third electrode is electrically coupled to one first electrode in each group;
    (h) a plurality of fourth electrodes formed on said nonlinear resistive layer, said fourth electrodes being in substantial registration with selected apertures in said insulating mask so that each fourth electrode is electrically coupled to a number of adjacent first electrodes;
    (i) first driving means for applying first and second energizing signals having a phase difference of 180 degrees therebetween and a magnitude less than that required to cause said electroluminescent layer to emit light to selected second and fourth electrodes respectively whereby the length of the illuminated bar is coarsely controlled; and
    (j) second driving means for applying third energizing signals to selected third electrodes, said third energizing signals being in phase with said second energizing signals to provide fine control for the illuminated bar.

8. Apparatus in accordance with claim 7 in which each third electrode is coupled to the same first electrode in each group and each fourth electrode is coupled to a number of adjacent first electrodes equal to the number of first electrodes in a group.

9. Apparatus in accordance with claim 8 in which the first second electrode on said electroluminescent layer overlies less than a complete group of first electrodes.

10. Apparatus in accordance with claim 7 further comprising:
    (a) means for receiving and supplying a predetermined number of the most significant digits of said input signal to said first driving means, said first driving means being coupled to said second and fourth electrodes whereby said second and fourth electrodes are energized in accordance with said number of digits, and
    (b) means for receiving and supplying the remaining digits of said input signal to said second driving means, said second driving means being coupled to said third electrodes whereby said third electrodes are energized in accordance with said remaining digits.

11. Apparatus in accordance with claim 10 in which the number of second electrodes is selected to be at least as small as the numeric sum of said predetermined number of most significant digits of the input signal.

12. Apparatus in accordance with claim 7 in which said insulating mask comprises:
(a) a first apertured insulating layer formed on said substrate and overlying a second portion of said first electrodes, said first layer having a plurality of apertures therein, each of said apertures being in substantial registration with one of said first electrodes;
(b) an apertured conducting layer formed on said insulating layer, the apertures in said layer being in registration with the apertures in said first layer, said layer being electrically coupled to said second electrodes; and
(c) a second apertured insulating layer formed on said conducting layer, the apertures in said layer being in registration with the apertures in said first layer.

No references cited.

JAMES W. LAWRENCE, Primary Examiner.

R. JUDD, Assistant Examiner.